(12) United States Patent
Eriksen et al.

(10) Patent No.: US 8,299,663 B2
(45) Date of Patent: Oct. 30, 2012

(54) ARRANGEMENT FOR COOLING OF AN ELECTRICAL MACHINE

(75) Inventors: Uffe Eriksen, Horsens (DK); Soeren Gundtoft, Fredericia (DK)

(73) Assignee: Siemens Aktiengesellschaft, München (DE)

( * ) Notice: Subject to any disclaimer, the term of this patent is extended or adjusted under 35 U.S.C. 154(b) by 290 days.

(21) Appl. No.: 12/606,226

(22) Filed: Oct. 27, 2009

(65) Prior Publication Data

US 2010/0102655 A1    Apr. 29, 2010

(30) Foreign Application Priority Data

Oct. 28, 2008 (EP) .................................... 08018797

(51) Int. Cl.
 H02K 9/00 (2006.01)
 H02K 9/06 (2006.01)
 H02K 1/32 (2006.01)
 H02K 3/24 (2006.01)
 H02K 5/18 (2006.01)
 H02K 5/20 (2006.01)

(52) U.S. Cl. ............... 310/64; 310/58; 310/59; 310/61; 310/62; 310/63; 310/65; 310/66

(58) Field of Classification Search .............. 310/58, 310/59, 61, 62, 63, 64, 65, 66; 290/44, 55; H02K 9/00, 9/06, 1/32, 3/24, 5/18, 5/20
See application file for complete search history.

(56) References Cited

U.S. PATENT DOCUMENTS

| | | | |
|---|---|---|---|
| 3,091,710 A * | 5/1963 | Shartrand et al. | 310/57 |
| 3,475,631 A * | 10/1969 | Bollibon et al. | 310/58 |
| 3,819,965 A * | 6/1974 | Schoendube | 310/58 |
| 4,163,163 A | 7/1979 | Gurevich et al. | |
| 4,264,834 A | 4/1981 | Armor et al. | |
| 5,883,448 A | 3/1999 | Zimmerman | |
| 6,882,068 B2 | 4/2005 | Weeber et al. | |
| 7,042,128 B2 * | 5/2006 | Zepp et al. | 310/191 |
| 7,345,385 B2 * | 3/2008 | Kreitzer | 310/59 |
| 2004/0066099 A1 * | 4/2004 | Weeber et al. | 310/58 |
| 2005/0035673 A1 * | 2/2005 | Lafontaine et al. | 310/58 |
| 2005/0258701 A1 * | 11/2005 | Soitu | 310/179 |
| 2007/0210656 A1 * | 9/2007 | Lafontaine et al. | 310/58 |
| 2010/0102655 A1 * | 4/2010 | Eriksen et al. | 310/63 |

FOREIGN PATENT DOCUMENTS

| | | |
|---|---|---|
| EP | 1586769 A2 | 10/2005 |
| JP | 2005162448 A | 6/2005 |
| WO | WO 0121956 A1 | 3/2001 |

OTHER PUBLICATIONS

Communication from Intellectual Property Office of New Zealand, Sep. 16, 2009, pp. 1-2.

* cited by examiner

*Primary Examiner* — John K Kim

(57) ABSTRACT

An arrangement for cooling an electrical machine is provided. The electrical machine includes a rotor and a stator, an air-gap being between the rotor and the stator. The stator includes a plurality of stacked laminate-plates. The laminate-plates include on a first side, which is facing the air-gap, a plurality of slots containing metal-windings of a stator-coil. The laminate-plates are positioned and fixed by a structural support and by end-plates in relation to a central-part of the stator. A joint cavity is formed by the end-plates, the central-part of the stator and an internal surface of the laminate-plates. The internal surface is defined by a second side of the laminate-plates, the second side being opposite to the first side. The cavity is coupled with an air-cooling-arrangement, which is arranged and used to circulate a cooling gaseous medium from the cavity to the air-gap and the laminate-plates back into the cavity.

13 Claims, 4 Drawing Sheets

FIG 2 A-A
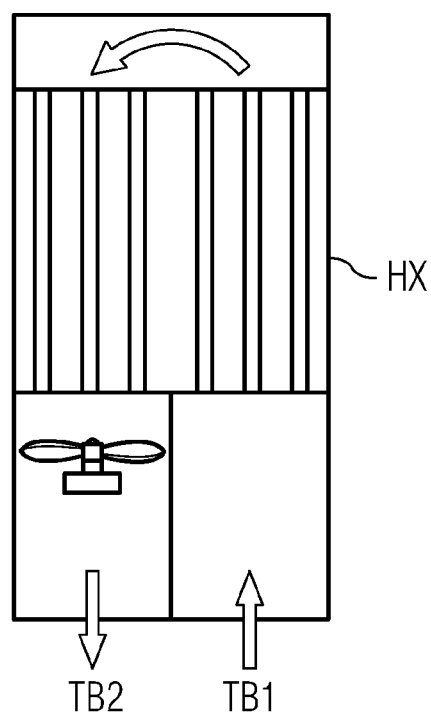
FIG 4
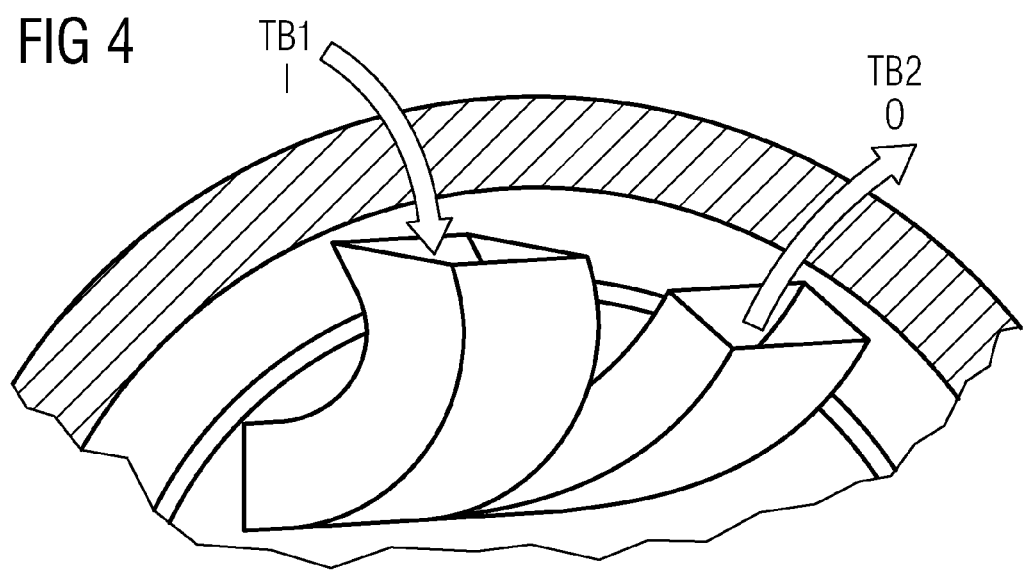

ARRANGEMENT FOR COOLING OF AN ELECTRICAL MACHINE

CROSS REFERENCE TO RELATED APPLICATIONS

This application claims priority of European Patent Office Application No. 08018797.4 EP filed Oct. 28, 2008, which is incorporated by reference herein in its entirety.

FIELD OF INVENTION

The invention relates to a cooling-arrangement of an electrical machine.

SUMMARY OF INVENTION

Electrical machines need cooling-arrangements to dissipate heat, which is generated during its operation by an ohmic resistance, by an iron hysteresis, etc.

It is possible to cool a small electrical machine by a heat-transfer from the inside of the machine to its surface. This is not possible for a large machine, which shows a relatively small surface per power rating and heat generation.

When a machine is installed indoor at a dry atmosphere it is possible to operate the machine without a housing, so a cooling is achieved by the circulation of ambient air through the machine.

But when the machine is installed under harsh conditions, like it is for generators being used in offshore wind-turbines, the electrical machine need to be totally enclosed, so ambient air is not allowed to circulate through the machine. For this application dedicated cooling-systems are required.

One very common cooling-method is the circulation of air or another gaseous medium inside the electrical machine, while the cooling-medium is kept cool by a heat-exchanger. This cooling method disadvantageously requires large gas-to-air or gas-to-water heat-exchangers. Furthermore considerable additional power is required to circulate the cooling-medium inside the machine.

Another cooling-method of a generator, which shows a stator and a rotor, is the circulation of a liquid inside cooling-channels on a first side of the stator. This first side to be cooled is opposite to an air gap, which is between the stator and the rotor. The stator shows a number of stacked laminate-plates, which carries metal-windings of stator-coils, so the heat is transferred from the metal-windings through the laminate-plates to the cooling-medium by conduction.

This cooling-method is not as effective as air-cooling, because winding-heads of the coils and the rotor itself is not cooled in the same way.

This cooling method shows the additional disadvantage, that it is difficulty to ensure a good thermal-contact between the laminate-plates of the stator and the cooling-channels.

The cooling-systems explained above need a lot of space to be assembled. Especially for a generator, which is located within a nacelle of a wind-turbine, needed space is a critical parameter—because of wind-forces acting on the nacelle and because other machines needs to be located within the nacelle without changing the dimensions, if possible.

It is an object of the invention to provide an improved arrangement for cooling of an electrical machine like a generator—especially for a generator, which is located within a nacelle of a wind-turbine.

This object is achieved by an arrangement as claimed in the independent claim. Advantageous embodiments of the invention are described in the dependent claims.

The inventive arrangement for cooling of an electrical machine comprises a rotor and a stator, while an air-gap is between the rotor and the stator. The stator comprises a number of stacked laminate-plates. The laminate-plates show on a first side, which is headed to the air-gap, a number of slots to carry metal-windings of a stator-coil. The laminate-plates are positioned and fixed by means for structural support and by end-plates in relation to a central-part of the stator to achieve the certain air-gap. A joint cavity is formed by the end-plates, the central-part of the stator and an internal surface of the laminate-plates. The internal surface is defined by a second side of the laminate-plates, while the second side is opposite to the first side.

The cavity is coupled with an air-cooling-arrangement, which is arranged and used to circulate a gaseous medium for cooling purposes from the cavity to the air-gap and the laminate-plates back into the cavity.

The inventive cooling-arrangement is located inside a built-in-cavity of the electrical machine in a preferred embodiment. So no additional space for the needed cooling-arrangement is needed.

There is an efficient cooling due to the continuous maintenance of cooled-air, which flow through heat-generating parts of the electrical machine.

As the cooling-air also passes the winding-heads of the stator-coil an efficient cooling is realised.

BRIEF DESCRIPTION OF THE DRAWINGS

The invention will be described in more detail by help of figures.

FIG. 2 shows a detail of a heat-exchanger, referring to FIG. 1, FIG. 4 shows another detail of the heat-exchanger, referring to FIG. 1.

DETAILED DESCRIPTION OF INVENTION

Figure 1:
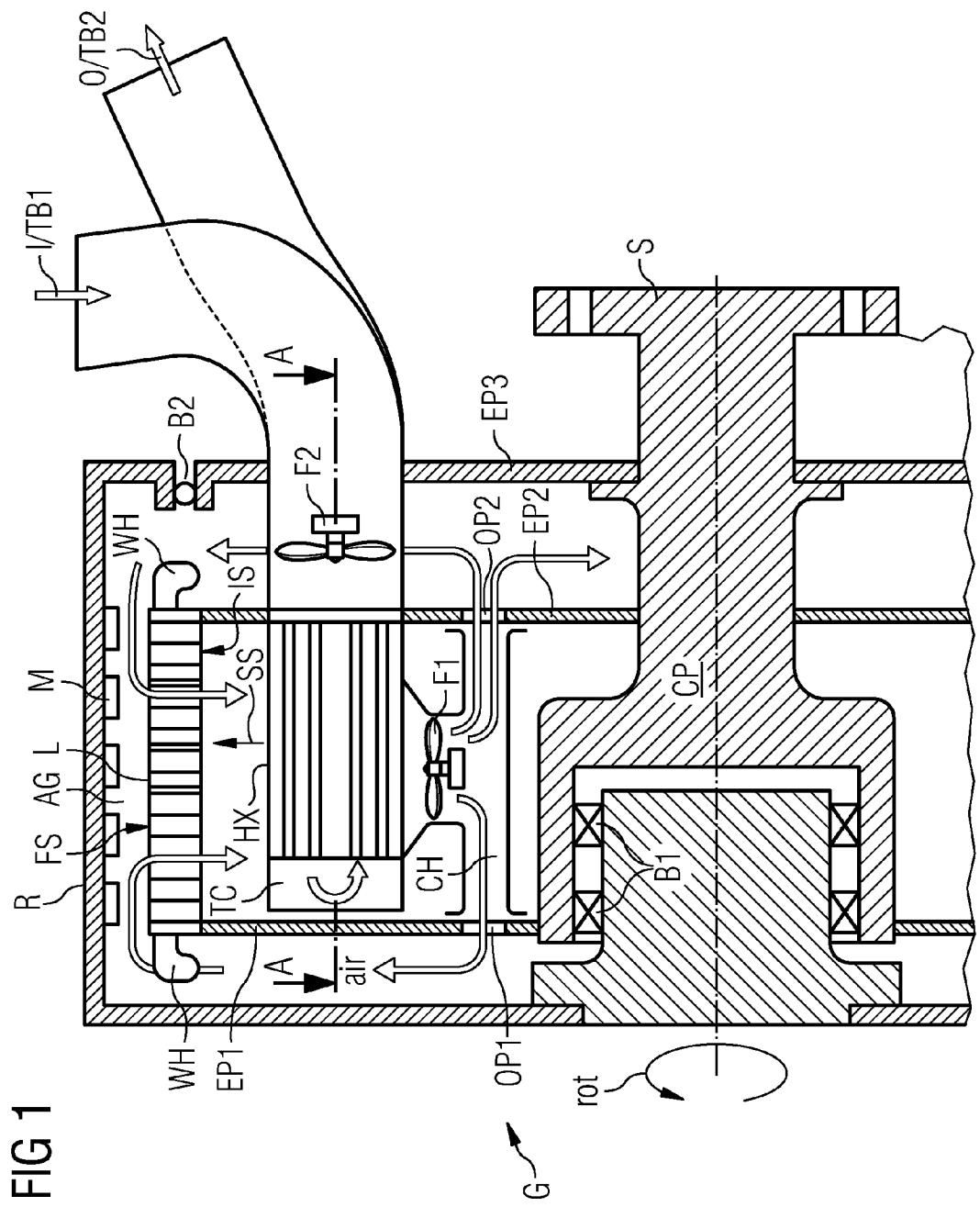
FIG. 1 shows a cross-sectional view of a generator, which is cooled according to the invention in a first embodiment.

FIG. 1 shows a cross-sectional view of a generator G as electrical machine, which is cooled according to the invention.

The generator G comprises an outer-rotor R and an inner-stator S. The stator S is connected via two bearings B1 and B2 with the rotor R. A second bearing B2 is kept at its position by help of an end-plate EP3.

The rotor R wears a number of magnets M, so the magnets M are headed to an air-gap AG, which is between the stator S and the rotor R.

The stator S comprises a number of stacked laminate-plates L, which are used to carry metal-windings of a stator-coil.

The laminate-plates L show a number of slots on a first side FS to carry the metal-windings of the stator-coil. This first side FS of the stator S is headed in direction to the air-gap AG.

A part of the stator-coil exceeds the slots of the laminate-plates L, forming winding-heads WH of the stator-coil.

The laminate-plates L are fixed and kept in position by means for structural support (not shown in detail). The means for structural support might be connected with the laminate-plates L by welding.

The stacked laminate-plates L are also positioned by two end-plates EP1, EP2 in relation to a central-part CP of the stator S. So the end-plates EP1 and EP2 are connected with the central-part CP of the stator S. The central-part CP of the stator S extends along a rotation-axis rot.

So a certain and constant air-gap AG is achieved by help of the end-plates EP1, EP2 and EP3, too.

The two end-plates EP1 and EP2, the central-part CP of the stator S and an internal surface IS of the laminate-plates L jointly finals a cavity.

The internal surface IS is defined by a second side SS of the laminate plates L, while this second side SS is located opposite to the first side FS of the laminate plates L, carrying the slots.

There is a first fan F1 for air-cooling-purposes, which is located inside the cavity. The first fan F1 is used to circulate the air inside the generator as described as follows.

There are slits (not shown in detail) between dedicated laminate-plates L, to allow the cooling-air to pass through.

There are also openings OP1 and OP2 into the end-plates EP1 and EP2, to allow the air to pass through.

So the air may circulate from the first fan F1 through the openings OP1 and OP2, passing the winding heads WH, until it reaches the air-gap AG. From the air-gap AG the air will pass through the slits of the laminate-plates L.

As the main heat is generated there, the cooling-air will be heated up while passing.

The heated-up air is directed to a heat-exchanger HX, which is also located inside the cavity. This heat-exchanger HX is used to cool-down the air.

In this embodiment the heat exchanger HX is built as a shell-and-tube heat exchanger with a turning chamber TC on a left side. This is only exemplary, any suitable kind of heat-exchanger can be used instead.

The heat-exchanger HX comprises two channels TB1, TB2, also referring to FIG. 2 and FIG. 4. The channels TB1, TB2 are used to circulate external ambient air for cooling through the heat exchanger HX.

To assist the air-flow there is a second fan F2, which is located inside the tube TB2 in a preferred embodiment.

To assist the air-flow there is also an internal channel CH.

FIG. 2 and FIG. 4 show the channels TB1 and TB2, while a first tube TB1 is used as air-inlet I and while a second tube TB2 is used as air-outlet O.

Figure 3:
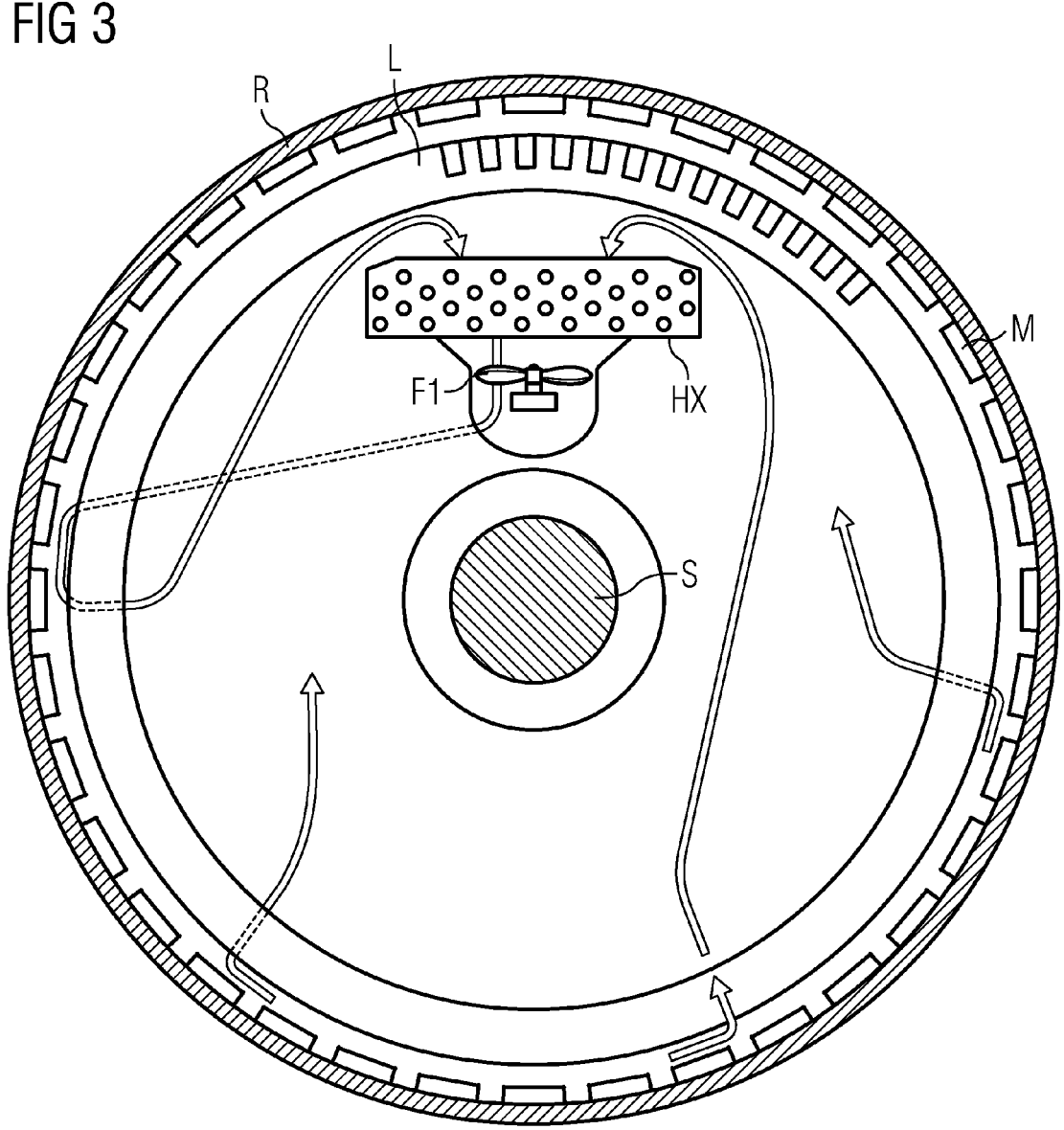
FIG. 3 shows a front view of the generator, referring to FIG. 1.

FIG. 3 shows a front view of the generator G, referring to FIG. 1, while the arrows relates to the air-flow inside the generator as described above.

Figure 5:
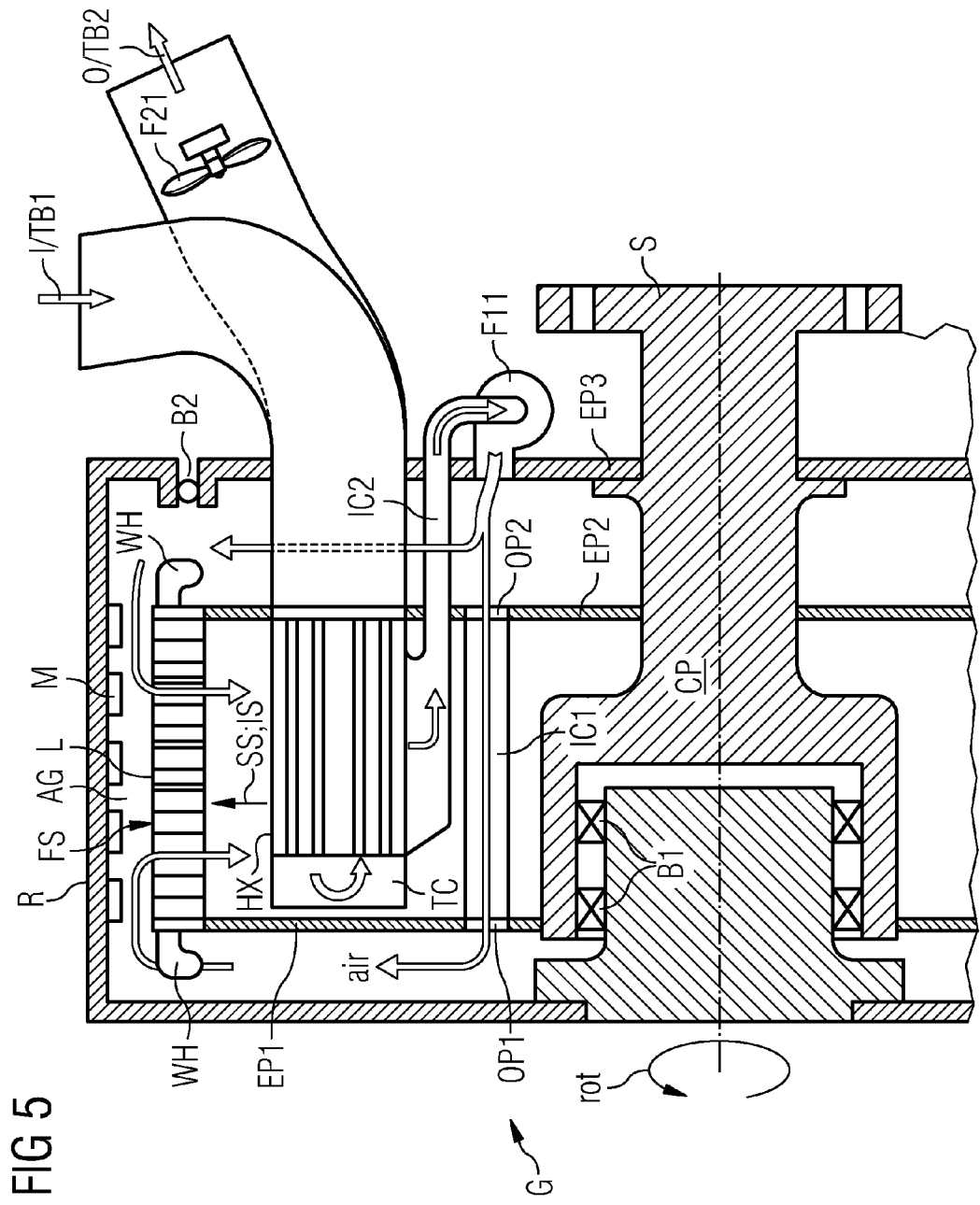
FIG. 5 shows a cross-sectional view of a generator, which is cooled according to the invention in a second embodiment.

FIG. 5 shows a cross-sectional view of a generator G, which is cooled according to the invention in a second embodiment. The generator G itself comprises the elements, which are described within FIG. 1—only the elements of the cooling itself differs slightly as now.

As described within FIG. 1 the two end-plates EP1 and EP2, the central-part CP of the stator S and an internal surface IS of the laminate-plates L jointly forms a cavity.

The internal surface IS is defined by a second side SS of the laminate plates L, while this second side SS is located opposite to the first side FS of the laminate plates L, carrying the slots.

There is a first fan F11 for air-cooling-purposes, which is located now outside the cavity, compared with FIG. 1.

To allow the circulation of air inside the generator the first fan F11 is connected via two internal channels IC1 and IC2 with the generator G.

The cooling-air may pass through slits of the laminate-plates L as described above. As the main heat of the generator G is generated there, the cooling-air will be heated up while passing.

The heated-up air is directed to the heat-exchanger HX, which is located inside the cavity as described above. This heat-exchanger HX is used to cool-down the air.

The cooled air is guided by a second internal channel IC2 out from the cavity and to the first fan F11. Then the air is guided from the first fan F11 into two directions as described now:

Approximately half of the air is guided with the help of a first internal channel IC1 over the winding-heads WH (which can be seen on a left side of the stator). Next the air passes through the slits of the laminate plates L and is guided back into the joint cavity.

The other half of the air is guided from the first fan F11 directly through a spacing, which is between the endplates EP2 and EP3, to the winding heads WH (which are located to a right side of the stator). Next the air is guided through the air gap, passing the slits of the laminate plates L and is guided back into the joint cavity.

So half of the air circulates from the first fan F11 through the openings OP1 and OP2 and the first internal channel IC1, passing the winding heads WH, passing the air-gap AG, passing the slits of the laminate plates L, passing the heat-exchanger HX, until the air arrives via the second internal channel IC2 at the first fan F11 again, while the other half of the air flows directly from the first fan F11 to the winding heads WH, the air gap, the slits, etc.

In this embodiment the heat exchanger HX is built as a shell-and-tube heat exchanger with a turning chamber TC on a left side. This is only exemplary, any suitable kind of heat-exchanger can be used instead.

The heat-exchanger HX comprises two channels TB1, TB2, as described above. The channels TB1 and TB2 are used to circulate external ambient air for cooling through the heat exchanger HX. To assist the air-flow there is a second fan F21, which is located inside the tube TB2 in a preferred embodiment.

The invention claimed is:

1. Arrangement for cooling of an electrical machine, comprising:
    an electrical machine with a rotor and a stator, an air-gap between the rotor and the stator, the stator including a plurality of stacked laminate-plates, wherein
        the laminate-plates include on a first side, which is facing the air-gap, a plurality of slots containing metal-windings of a stator-coil, and
        the laminate-plates are positioned and fixed by a structural support and by end-plates in relation to a central-part of the stator to achieve the air-gap;
    wherein the stator comprises a joint cavity formed by the end-plates, the central-part of the stator and an internal surface of the laminate-plates, the internal surface being defined by a second side of the laminate-plates which is opposite to the first side,
    wherein the joint cavity of the stator comprises a fan which circulates a gaseous medium from the cavity through openings of the end-plates to the air-gap, passing winding-heads of the stator-coil,
        circulates the gaseous medium from the air-gap through opening of the stacked laminate-plates back into the cavity, and
    wherein the joint cavity of the stator comprises a heat exchanger for cooling the gaseous medium, wherein the heat exchanger is located inside the joint cavity.

2. The arrangement according to claim 1, wherein the rotor is an outer rotor and the stator is an inner stator.

3. The arrangement according to claim 1, wherein the stator is connected via bearings with the rotor.

4. The arrangement according to claim 1, wherein the heat exchanger is built as a shell-and-tube heat-exchanger.

5. The arrangement according to claim 1, wherein the heat-exchanger is connected via two channels with an ambience for allowing ambient air to be used for the cooling-purposes.

6. The arrangement according to claim 4, wherein the heat-exchanger is connected via two channels with an ambience for allowing ambient air to be used for the cooling-purposes.

7. The arrangement according to claim 1, wherein the central-part of the stator extends along a rotational axis of the rotor.

8. The arrangement according to claim 1, wherein the stator-coils exceed the slots of the laminate-plates to form the winding-heads of the stator-coil.

9. The arrangement according to claim 1, wherein the electrical machine is a generator.

10. The arrangement according to claim 5, wherein a first channel is used as air-inlet, while a second channel is used as air-outlet.

11. The arrangement according to claim 10, wherein a second fan is located inside the second channel.

12. The arrangement according to claim 6, wherein a first channel is used as air-inlet, while a second channel is used as air-outlet.

13. The arrangement according to claim 12, wherein a second fan is located inside the second channel.

* * * * *